United States Patent [19]
Kurtzberg et al.

[11] Patent Number: 5,691,895
[45] Date of Patent: Nov. 25, 1997

[54] MECHANISM AND ARCHITECTURE FOR MANUFACTURING CONTROL AND OPTIMIZATION

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 573,818

[22] Filed: Dec. 18, 1995

[51] Int. Cl.$^6$ ............... G05B 13/02; G06F 18/00
[52] U.S. Cl. ............ 364/148; 364/151; 364/468.02; 364/468.05; 364/468.15
[58] Field of Search ................. 364/148–165, 364/138, 139, 468.01, 468.02, 468.03, 468.05, 468.06, 468.07, 468.08, 468.15, 468.16, 468.17, 401–403

[56] References Cited

U.S. PATENT DOCUMENTS

| | | | |
|---|---|---|---|
| 5,384,697 | 1/1995 | Pascucci | 364/139 |
| 5,486,995 | 1/1996 | Kirst et al. | 364/149 |

Primary Examiner—Reba I. Elmore
Assistant Examiner—Thomas E. Brown
Attorney, Agent, or Firm—Whitham, Curtis, Whtiham & McGinn; Stephen C. Kaufman

[57] ABSTRACT

A comprehensive, generic mechanism models, monitors, controls and optimizes manufacturing as an on-line, real-time system employing statistical analysis and mathematical techniques with feedback and forward information for local control and global optimization. Manufacturing is treated as a hierarchy of processes which are modeled, controlled, optimized and managed via four interacting networks; an application modeling network, a local control network, a global optimization network, and an implementation/management network. Of these four networks, only the application modeling network is application dependent. The functions of the other three networks are application independent. All manufacturing processes, from simple process steps through manufacturing sectors and lines, to complete factories, are treated identically, thereby simplifying computational complexity. A minimal set of parameters is thereby obtained at any manufacturing level, which reduces a complex manufacturing process to a manageable form. Outputs of lower level processes in the hierarchy become input process variables for higher levels. Process models are developed and updated via on-line data analysis, and are used to evaluate process status and improvement path.

8 Claims, 10 Drawing Sheets

MECHANISM AND ARCHITECTURE FOR MANUFACTURING CONTROL AND OPTIMIZATION

BACKGROUND OF THE INVENTION

1. Field of the Invention

The present invention generally relates to optimization of manufacturing processes and, more particularly, to systems which control manufacturing in real-time for local process control and global product optimization.

2. Background Description

In manufacturing, computer software programs which monitor the process have been developed with a focus on a specific product. In each factory, software must be developed to meet the needs of that particular factory. Generally, computer aided manufacturing (CAM) systems which have been developed to control the manufacturing processes in one particular factory cannot be used in other situations.

Previous methods for managing manufacturing processes and industrial experiments, statistical packages, and control charts provided process status information. These approaches do not provide comprehensive and systematic process analysis, product quality control, or optimize an entire manufacturing process.

System operation relies on certain specific techniques including response surface mapping and regression for model building of numeric variables and non-numeric analysis for evaluation of the effects of non-numeric factors. Time-evolution models, which may be highly nonlinear, are used in forecasting process behavior and are based on standard time-series analysis techniques; e.g., autoregression. Cluster analysis is used to identify the set of observations that reflect the current process behavior.

SUMMARY OF THE INVENTION

It is therefore an object of the present invention to provide a comprehensive, generic mechanism to model, monitor, control and optimize manufacturing, from a simple process to a complete factory.

According to the invention, there is provided an on-line, real-time system that employs statistical analysis and mathematical techniques with feedback and feed forward information for local control and global optimization. Improved process performance and product quality are the result. The invention leads naturally to a flexible, adaptive and reliable control system.

Manufacturing is treated as a hierarchy of processes which are modeled, controlled, optimized and managed via four interacting nets. All manufacturing processes, from simple process steps through manufacturing sectors and lines, to complete factories, are treated identically, thereby simplifying computational complexity. A minimal set of parameters is thereby obtained at any manufacturing level, which reduces a complex manufacturing process to a manageable form. Outputs of lower level processes in the hierarchy become input process variables for higher levels. Process models are developed and updated via on-line data analysis, and are used to evaluate process status and improvement path.

The architecture of the invention partitions its logical structure into four interacting networks; an application modeling network a local control network, a global optimization network, and an implementation/ management network. Of these four networks, only the application modeling network is application dependent. The functions of the other three networks are application independent.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
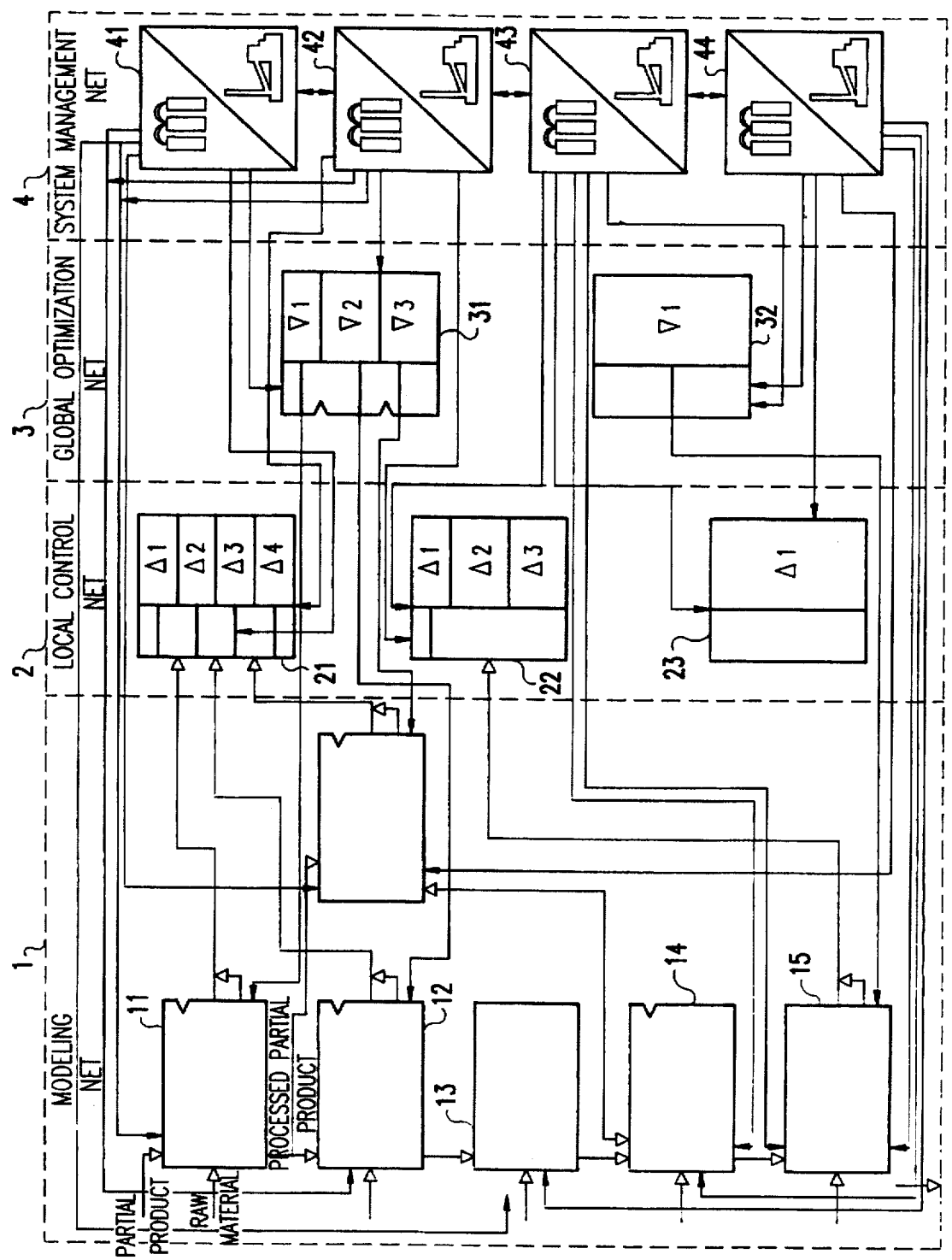
FIG. 1 is a block diagram of the network structure according to the invention.

Referring now to the drawings, and more particularly to FIG. 1, there is shown the architecture of the invention. This architecture partitions the logical structure into four interacting networks. These are the application modeling or process definition network 1, the local control network 2, the global optimization network 3, and the implementation/ management network 4, respectively.

The application modeling or process definition network 1 represents manufacturing process flow, where nodes 11 to 16 denote processes and edges (i.e., node interconnections) describe product flow. The nodes and edges represent generalized processes and product flow in FIG. 1, and the number of nodes and edges connecting them are arbitrary in this illustration. Therefore, for the most part the nodes are not labeled since these will vary from application to application. However, to illustrate the concept, node 11 has as two inputs a partial product and raw materials, and node 16 has as one input a processed partial product which is output by node 11.

The modeling network models the specific application, explicitly defining the manufacturing process to be controlled and optimized in terms of process parameters and target specifications. The modeling network is a non-uniform hierarchical network in which a node may represent a simple process step or a complex process defined by its own application modeling network. This network is application dependent. When applying this system to different fields of manufacture, this is the only network where changes must be made. In this network, a description of the object of manufacture is provided including specifics and parameters. This network explains relationships between the variables. Each step of the process may be set out in one of nodes 11 to 16 in the modeling network 1.

The local control network 2 represents local process control, where nodes 21 to 23 denote control operations and edges specify control parameters flow. The local control network 2 evaluates information from the modeling network 1 to tune the process as close as possible to its current targets and modify the control parameters in the application-modeling network appropriately. The function of this network are application independent.

The global optimization network 3 represents global (product) improvement, where nodes 31 and 32 denote target (specifications) adjustment operations and edges specify target specification flow. The global optimization network 3 processes information from the modeling network 1 and adjusts target parameters in the modeling network 1 to improve overall production performance. The functions of this network are application independent.

The implementation/management network 4 represents the implementation of the actual physical processors and its system management, where nodes 41 to 44 denote real workstations and edges specify the operation of the respective nodes of the modeling network 1, the local-control network 2, and the global optimization network 3 by the respective workstation. Specifically, the implementation/management network 4 implements the change in-time of the process models and the functionality of the local-control and global-optimization network nodes. The functions of this network are application independent.

Manufacturing Modeling

The architecture maintains all manufacturing models via the modeling network 1. These represent process steps, sectors, manufacturing lines, equipment, partial and complete products, etc. The term process is used generically and represents any manufacturing activity which affects the characteristics of the item being worked on. Although equipment and processes are treated the same (both have inputs, outputs and models), they are managed via separate models to enable separation of effects of the manufacturing processes from the tool which implement them. Thus, the contributions of tools and actual processes to any manufacturing operations are automatically identified even though they are combined for a total model.

The models themselves may be analytic, with given functional forms, or empirical, in which case second order (or higher) multivariate polynomial forms are used. Time-evolution models, which may be highly non-linear, are used in forecasting process behavior and are based on time-series analysis techniques (i.e., autoregression, neural-nets or others).

Process variables are classified into four basic types; measurable, controllable, ideal, and computed. The measurable variables are parameters obtained from direct measurements. Controllable variables are parameters which directly control the process. Ideal variables are parameters which define nominal manufacturing targets (specifications). Computed variables are parameters derived from measurable variables and are used to reduce the computation load and for generating data from models which do not have measurable variables. They can be also used to capture knowledge from basic physical laws that characterize the physical process or product.

The simplest possible model is constructed which correctly describes process behavior. Consequently, the system ranks, automatically, contributions of variables to process models, and uses the smallest set of process variables which explain process behavior within a given confidence level. These are the primary variables. All other variables are stored in a secondary variable set for possible future transfer to the primary set, if needed. As processes change in time, significant secondary variables are automatically transferred to the primary set, and insignificant primary variables are transferred to the secondary set.

Process models are normally updated using "business-as-usual" data from the floor. This means minimum interference with manufacturing operations. At times, these data are insufficient to produce statistically significant results and more drastic action is required. In such cases, the system goes into an experimental design mode and requests a series of measurements to enable proper updating of the model.

In many manufacturing processes, data required for real-time analysis are not available when needed (e.g., off-line measurements). In such cases, the system generates required data from the current model. It then updates that model when model data are available.

The system provides trend and forecasting analysis. These are used in prediction of process behavior, warnings, messages, etc., and are displayed via control charts.

The Implementation/Management Network

The architecture is implemented via a network of loosely coupled workstations, such as IBM RS/6000 workstations, to provide task assignment and load sharing. This means that there need not be dedicated workstations. Instead, the workload is controlled by a dynamic task management system which evaluates load requirements, processor capacities and status, and, optimally, assigns tasks to the workstations. The implementation/management node dynamic task management is performed by a time-dependent implementation/management network workstation. This approach results in an adaptable (environment changes), flexible (upgradable) system.

The system employs the concepts of control tasks with master/slave combinations, in which a "dying" master is automatically replaced by a backup master (former slave). The system monitors itself continuously. Task assignments for load sharing are of the two-stage class whereby an initial global assignment is derived first, followed by dynamic adjustment which reflects recent changes.

Operations in this system are coordinated via a synchronization time line which ensures that the appropriate corrective actions are applied properly. This means that feed forward corrective actions, which apply to current product, are executed at the proper time on their designated items. Conversely, feedback corrective actions, which apply to future product, are executed on upcoming product.

Functional Operation

During each cycle of operation, the system goes through several steps, by the application-modeling, local-control and global-optimization nets, implemented by the implementation/management net. Each cycle begins with acquisition of new data and ends with possible adjustment of control and ideal parameters. These steps are described below and illustrated in a flowchart of the functional operation shown in FIG. 2.

Figure 3:
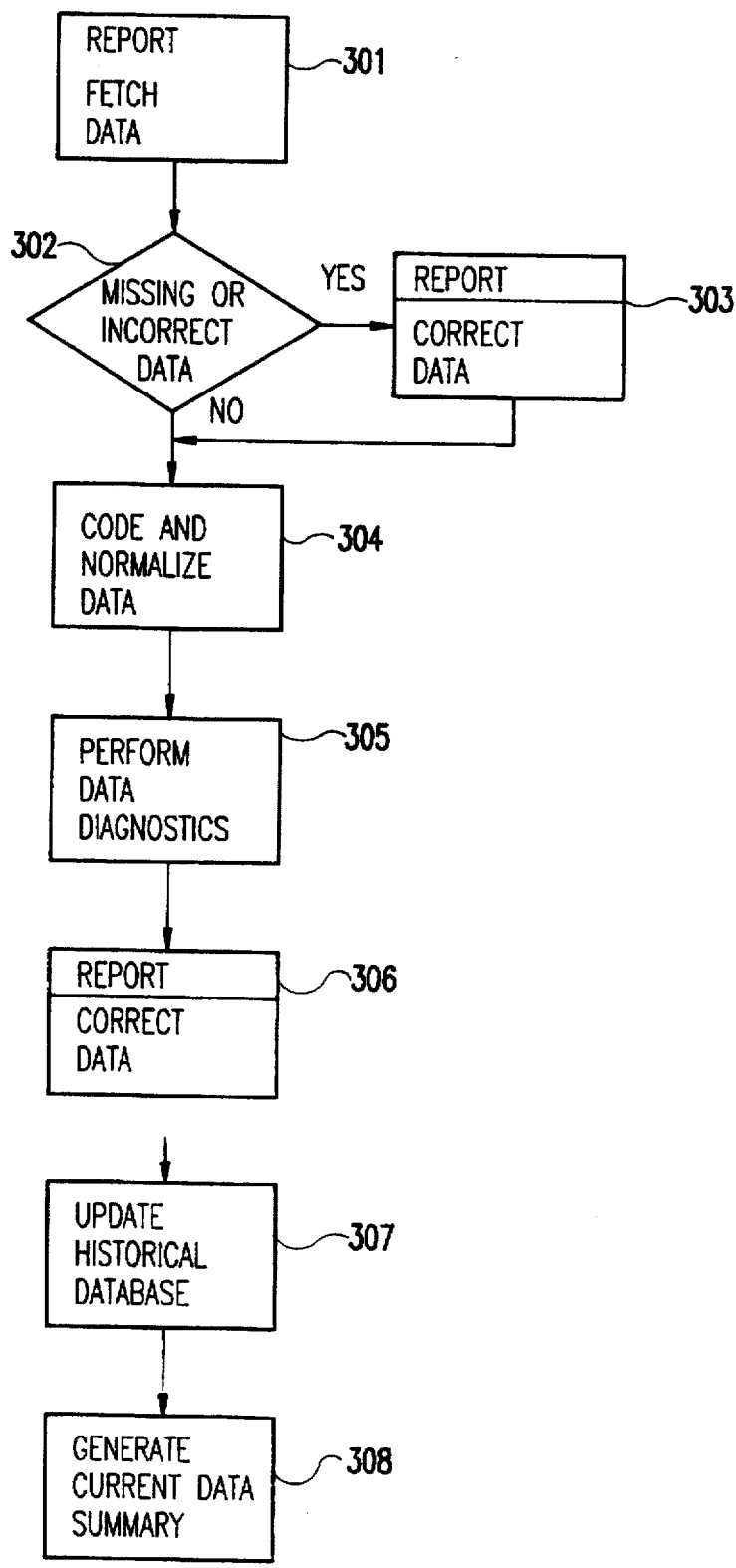
FIG. 3 is a flow diagram of the data acquisition process of FIG. 2.

Beginning with the data acquisition and preparation step at function block 201, this step prepares data for subsequent analysis. Its function is to insure data reliability and to format data for subsequent use. Here, observations with incomplete or incorrect data are treated or eliminated, outliers are deleted and collinear variables are removed. Data distribution tests are performed to identify the data underlying distributions and, possibly, to determine need for transformations to exhibit proper statistical properties (e.g., taking logarithms to approach a normal distribution). Variables data are coded in dimensionless form as deviations from targets, in units of standard deviations, for subsequent analysis, so that variables can be directly compared regardless of their natural scale of units. The major operations performed at this step are shown in FIG. 3, to which reference is now made.

The first step in function block 301 is to fetch raw data and display summary statistics. A test is then made in decision block 302 to check for missing and incorrect data. If missing or incorrect data are found, then in function block 303, all data errors are corrected and reported; otherwise, the process proceeds. In function block 304, data generating models are updated from on-line or off-line measurements. This is followed in function block 305 by coding the raw data. The data are normalized to specifications. Next, in function block 306, data diagnostics are performed, including normality, colinearity and outlier tests. Based on the results of the diagnostics performed, data correction is made and the action reported in function block 307. The actions taken can include data transfer and variable or observation action. The historical database variables and statistics are updated in function block 308. Finally, a current data summary including yield, quality factor, variability, etc., is generated in function block 309.

Returning to FIG. 2, at the conclusion of this step in function block 201, there is high confidence in the data used for process evaluation. The next step is data evaluation and modeling in function block 202. This step is handled by the local control network 2 (FIG. 1) for process control, and by the global optimization network (FIG. 1) for product improvement. It performs all required analysis for evaluation of processes behaviors. Cluster analysis is used to identify the set of observations that reflect the current process behavior; process and product trends, cycles and forecast are computed using time-series analysis techniques. Correlation analysis is performed to detect missing primary variables and insignificant model parameters. Process and product models are developed or updated, and their validity tested. For all models, data are initially regressed on second order multivariate polynomial forms to generate preliminary process response surface. Neural net modeling is performed if classical regression is insufficient.

Figure 4:
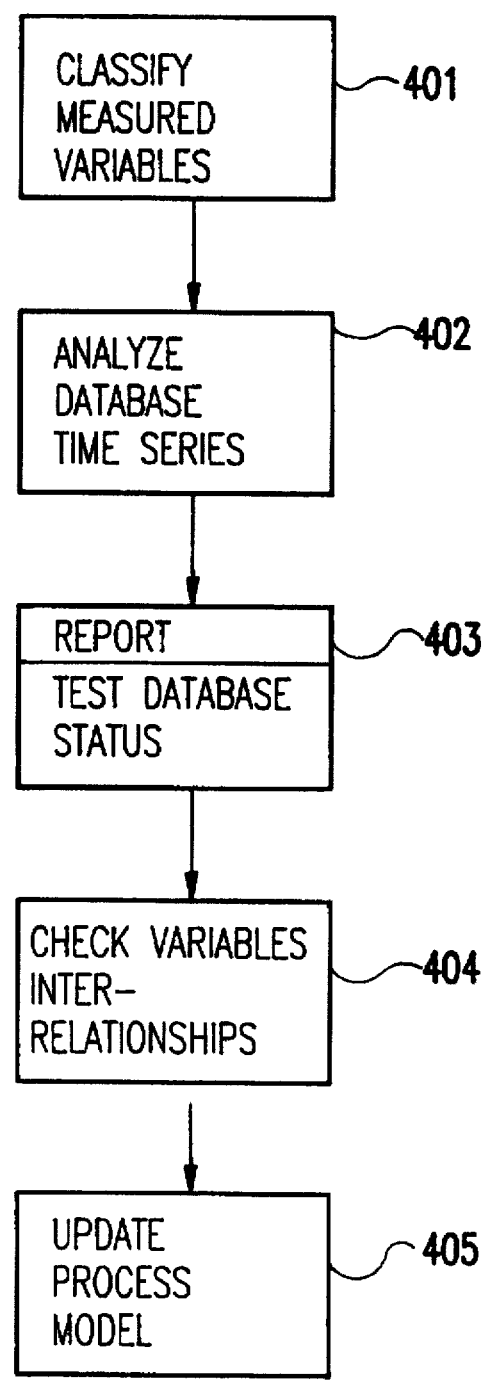
FIG. 4 is a flow diagram of the data evaluation process of FIG. 2.

Based on analysis results, the system determines a subsequent course of action by the local control network 2 and by the global optimization network 3. This action may be improvement analysis, if generated and/or updated models are consistent with data, or secondary analysis, if important parameters are missing. If analysis is inconclusive, the system requests additional data. The system will request additional data or a design of experiments on all independent process variables which do not exhibit sufficient variability, necessary for model update. The major operations performed at this step are shown in FIG. 4, to which reference is now made.

The first step in function block 401 is to classify measured variables, clustering in time and parameter space. Next, in function block 402, database time series are analyzed to determine trends, cycles and forecasts; generate control charts (e.g., Shewhart/CuSum). In function block 403, database status is reported, including statistics, normality and serial correlation. A check is then made in function block 404 to determine if there are missing significant variables or insignificant measured variables. The process model is then updated in function block 405 by response surface mapping, experimental design (if needed), and ranking of variables.

Returning to FIG. 2, a test is made in decision block 203 to determine if the model explains the data. If model is good, that is, it agrees with the data, then the process goes to process improvement analysis function block 204 on the right side of the flow diagram; otherwise, the process goes to the secondary variables analysis function block 205 on the left side of the flow diagram.

Considering first the improvement analysis of the process, if data and models are consistent, potential improvements are investigated. Optimum conditions based on process and product response surfaces are derived, their statistical significance evaluated, and the cost of making process changes are compared with the incremental gain in value and net profit of the product. Feedback and feed forward information from process external to the one being controlled are taken into account, and subsequent course of action is determined by cost-to-profit ratio, assuming statistical significance. Expected process and product responses under nominal, actual, and optimum conditions are computed as well as optimization path to affect process and product improvement.

Specifically, the local control network 2 (FIG. 1) uses updated models from local processes to determine the actual process state ("where you are") and the current nominal process state ("where you aimed") and if the difference is significant, as determined in decision block 206, changes the settings of the controllable variables in the modeling network 1 to enable the process to approach its current nominal state, as indicated by the process flow to function block 207.

The global optimization network 3 (FIG. 1), in turn, uses a global model to determine the product optimum state ("where you should be") and nominal state ("where you aimed") and, if the difference is significant, alerts manufacturing personnel in function block 208 that additional improvement is possible via changes in current specifications for individual process. Upon authorization, the global optimization network 3 changes the nominal specifications, in the modeling network processes, as indicated by the process flows to function blocks 209 and 210, so that the product approaches its optimum state.

The adjustment of the controllable variables (by the local control network 2) and the ideal variables (by the global optimization network 3) to improve the process, can compensate not only for perturbations in the current process, but also for the ill effects of previous manufacturing processes, thereby minimizing the need for product rework. Feedback (for future product) and feed forward (for current product) provide the necessary mechanism to do so.

The adjustment of process variables in a multi-level process is performed recursively, as a composite function, starting from a measurable parameter downstream and terminating in controllable parameters upstream. Thus, the control/optimization cycle may propagate upstream through the hierarchy to a lower level where the appropriate controllable variable is adjusted.

Figure 5:
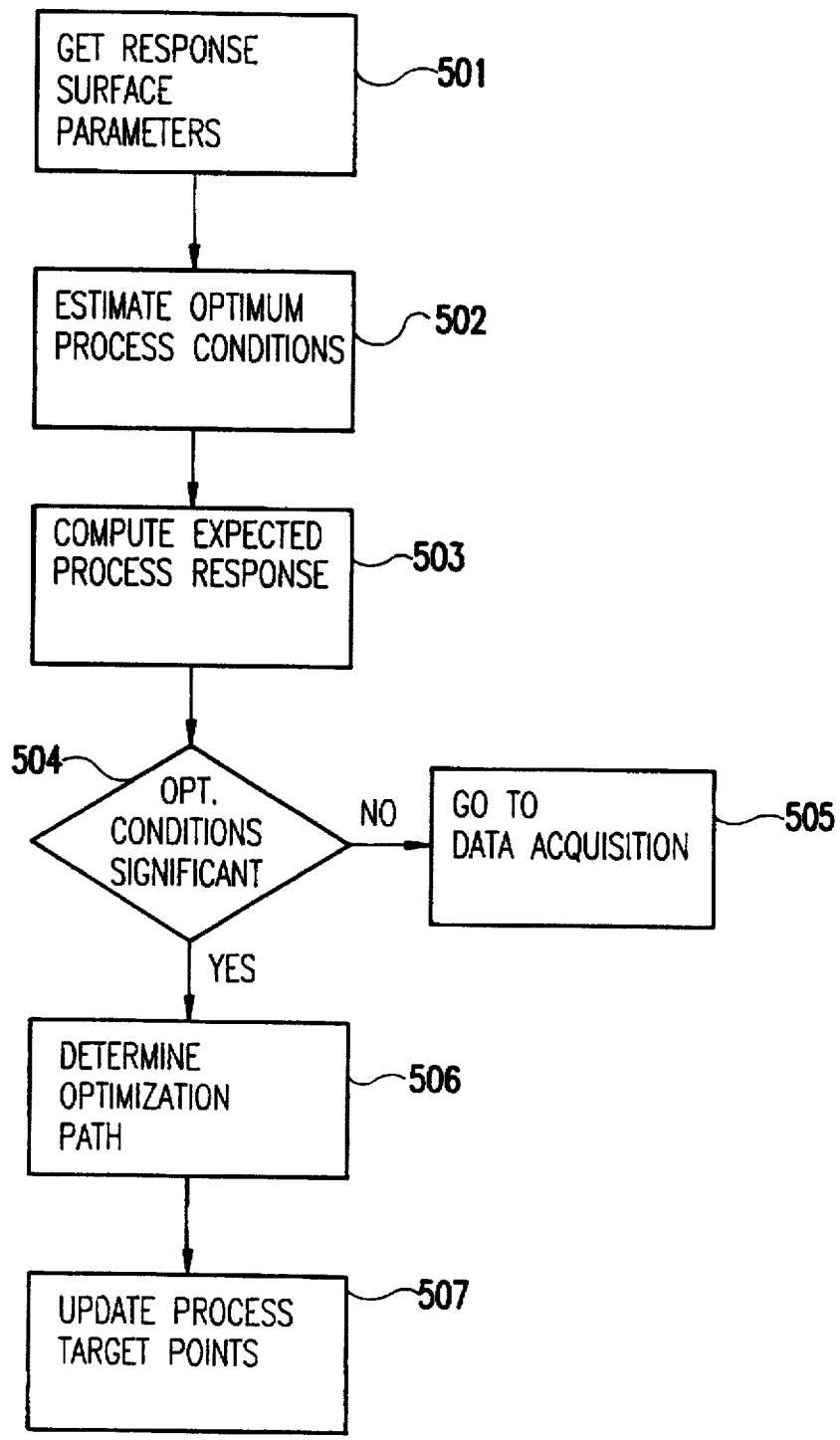
FIG. 5 is a flow diagram of the data improvement process of FIG. 2.

The major operations performed at the improvement analysis process are shown in FIG. 5. The first step, in function block 501, is to get the response surface parameters, including empirical or analytic model parameters. Then, in function block 502, optimum process conditions are estimated using unconstrained optimums for global optimization, quadratic progression for constraint optimization, and goal programming for multiple goals. The expected process response is computed in function block 503, including nominal, current and optimal conditions. A test is made in decision block 504 to determine if optimum conditions are significant; if not, the process goes to data acquisition in function block 505. In function block 506, the optimization path is determined, including step size and direction. Then, process specifications are tuned in function block 507 using product to process inverse maps. Finally, process target points are updated using feed forward for current product and feedback for future product in function block 508.

At the conclusion of the improvement analysis process, the controllable variables settings (under the local control network supervision) and the ideal variables settings (under the global optimization network control) are updated as described in the equipment/process update section below.

Figure 2:
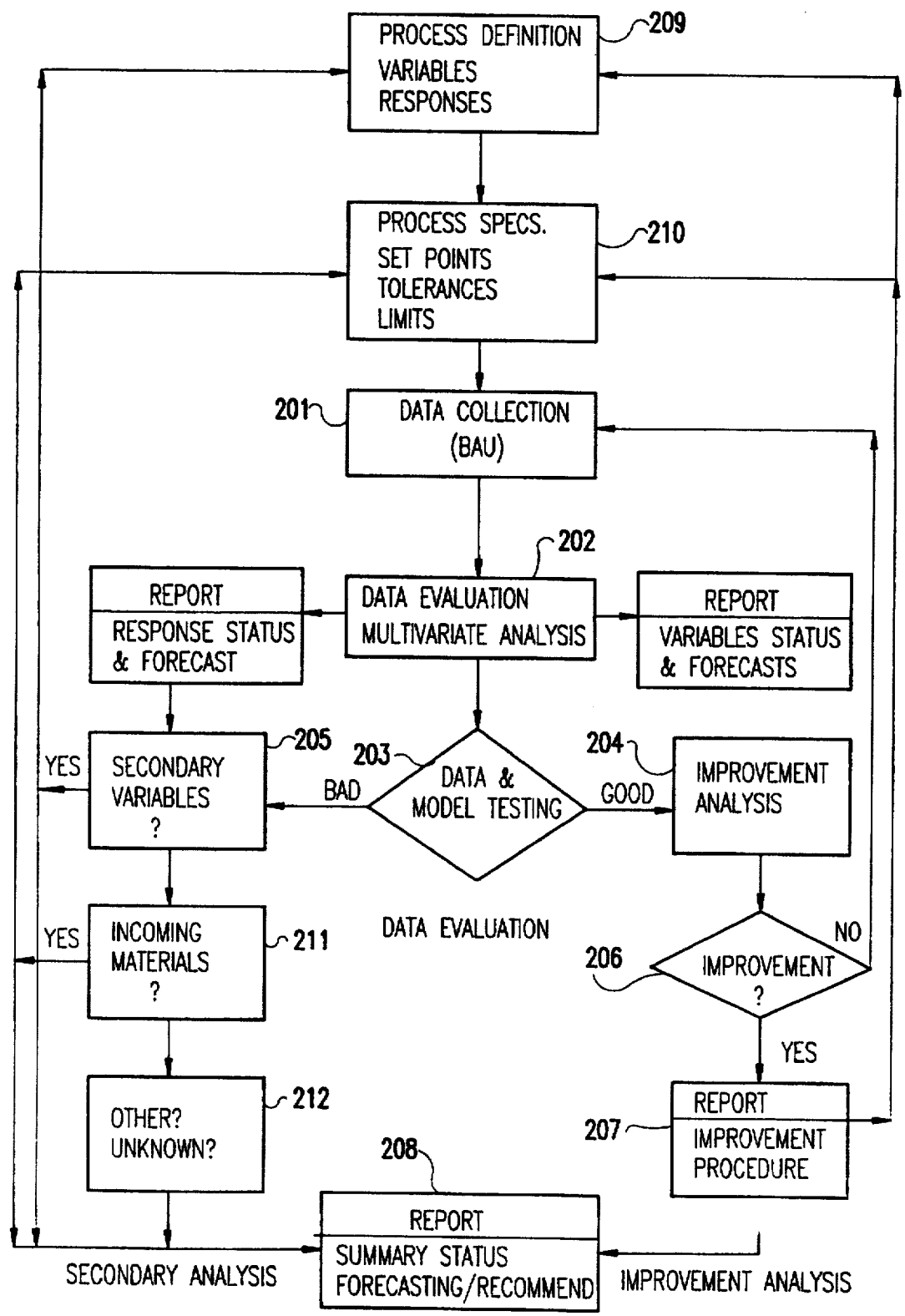
FIG. 2 is a flow diagram of process implemented by the network structure of FIG. 1.

Turning now to the secondary variables analysis on the left side of FIG. 2, if the new data do not correlate well with the model (as defined by the current process behavior), secondary variables are examined for possible model improvement. This means that the correlations between secondary variables and process response are evaluated by the local control network 2 (FIG. 1) as well as the secondary variables contributions to the model's multiple correlation coefficient, and are automatically transferred into the primary set if the significance threshold is exceeded. Similarly, primary variables which are found to be insignificant are eliminated from the process model and are transferred to the secondary set for possible future incorporation in the model. All problems are characterized and stored in appropriate tables for subsequent interrogation via pattern-recognition algorithms.

Figure 6:
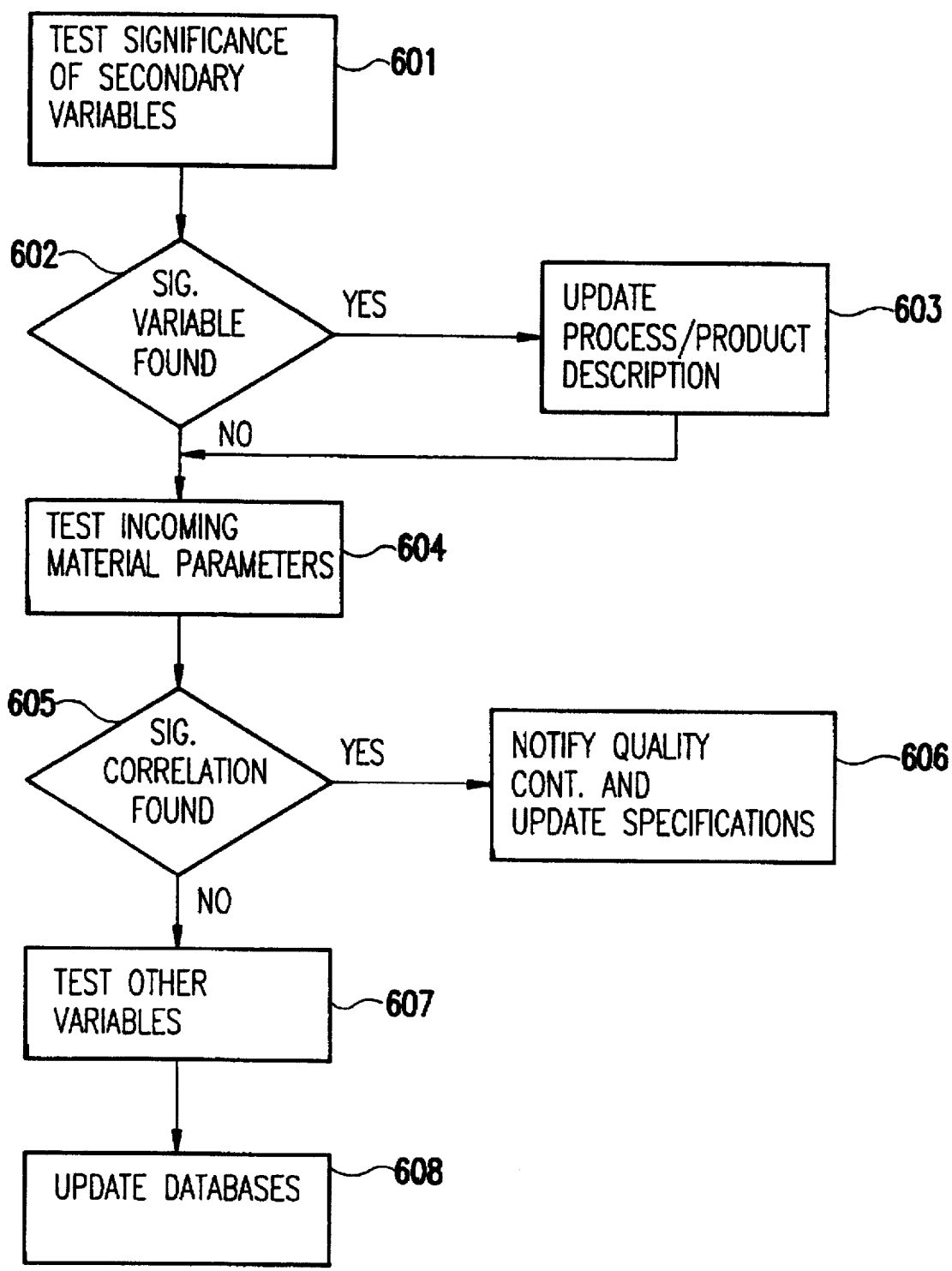
FIG. 6 is a flow diagram of the secondary analysis process of FIG. 2.

At the conclusion of this process, the primary variables set and the secondary variables set are updated, reflecting the latest changes in process models and specifications, as described in equipment/process update section below, and appropriate warnings are sent to manufacturing personnel via the report in function block 208. The major operations performed at this secondary analysis process are shown in FIG. 6, to which reference is now made.

The significance of secondary variables is tested using correlation with response and improvement in model fit in function block 601. A test is made in decision block 602 to determine if a significant variable is found. If so, process and/or product description are updated in function block 603, as indicated by the process flow from function block 205 to function block 209; otherwise, the process proceeds. Incoming material parameters are tested in function block 604 (function block 211 in FIG. 2) for vendor, batch, data classification, and correlation with process response. A check is made for significant correlation in decision block 605. If found, quality control is notified in function block 606 and process specifications are updated; otherwise, the process proceeds. Other possible variables are tested in function block 607 (function block 212 in FIG. 2) including environmental, contamination, tools, and problem history database. The process history and problem history databases are updated in function block 608, as indicated by the process flow to function block 210 in FIG. 2.

All changes and modifications, produced by the system during its cycle operation are reflected by the update of the appropriate process parameters. This may be an updated model due to recent data, model modifications due to secondary analysis, or adjustment of set points resulting from improvement analysis. Initially, the process is described by the user.

Figure 7:
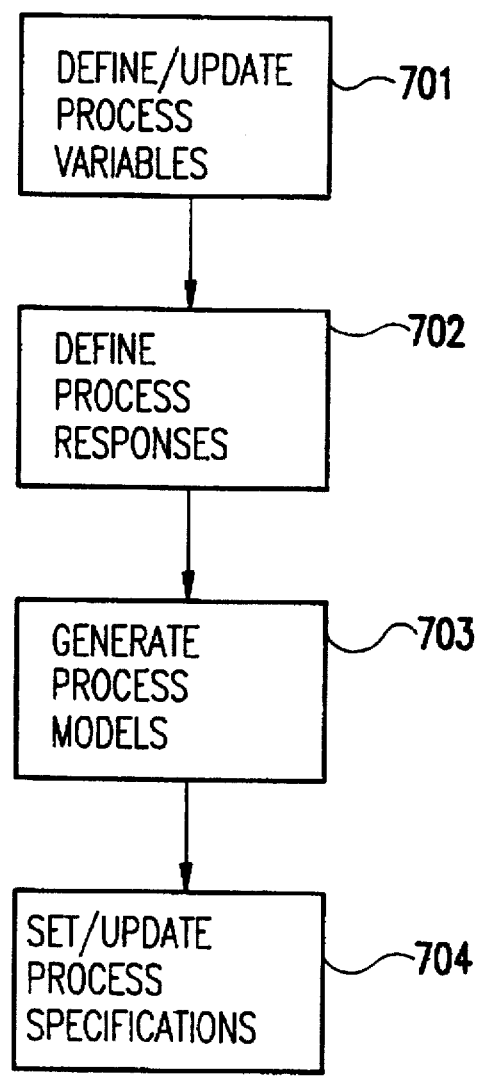
FIG. 7 is a flow diagram of the process description process of FIG. 2.

Equipment models are treated in a similar fashion except that they do not have a secondary variables set and are restricted to the manufacturer set of parameters. All activities related to maintenance operations update only the equipment models. The combined process/machine model is the model used in any corrective action. The major operations performed at the process definition step of function block 209 are shown in FIG. 7, to which reference is now made.

The first step in function block 701 is to define and update process variables including both primary and secondary variables. Next, in function block 702, process responses are defined, including response parameters, measured versus generated responses, timing accuracy, and goals and ranking order. Next, in function block 703, process models are generated, including model codes, model parameters, and intra-process correlations. Then, in function block 704, process specifications are set and updated, including set points, tolerances and constraints.

Figure 8:
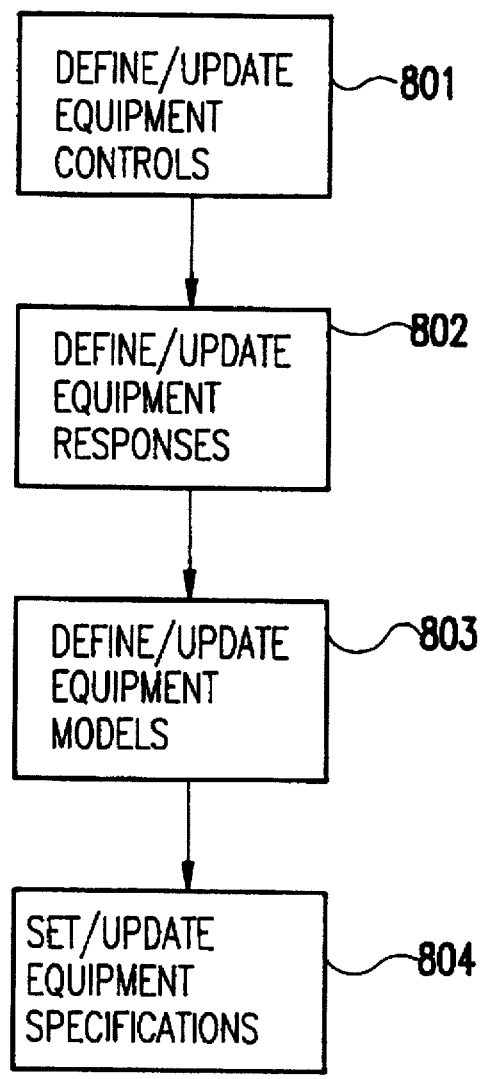
FIG. 8 is a flow diagram of the equipment description process of FIG. 2.

FIG. 8 shows the major operations performed in the process specification function block 210 for the equipment description. The first step in function block 801 is to define and update equipment controls, including tool class and number, control parameters and control specifications. Next, in function block 802, equipment responses are defined and updated, including tool class and number, response parameters, responses ranking, and characteristics (e.g., precision, timing). Then, equipment models are defined and updated in function block 803, including model codes and parameters. Finally, in function block 804, equipment specifications are set and updated, including set points, tolerances and constraints. At the conclusion of this step, equipment and process models are updated to reflect the current knowledge of the process and equipment.

Note that the workstation-nodes of the implementation/management network 4 (FIG. 1) implement the functions of the local control and global optimization networks and the models describing the modeling network, presented below.

The system maintains its own summary database which is designed for speed and ease of access. The approach is to use a small and flexible database with fast response for on-line operation. This database can be implemented as a real (physical) database, or as a virtual database which utilizes pointers to data in real databases.

The system also maintains a problem history database in which all encountered problems and their resolutions are recorded. Keywords are assigned to cases for ease of searching. This database is used by the system to aid in problems, resolutions, as part of its secondary analysis, and can be used off-line by process engineers.

System Implementation

Given a set of n processors (workstations), and sets of tasks to be executed, an algorithm is used to find assignment of tasks to processors such that all tasks are assigned and all assignments are within processors capacities. Let $L(T_j)$ denote the processing load for task $T_j$ (instruction execution count for time t). Let $K(P_i)$ denote the capacity of processor $P_i$ (instructions executed per time t). Let $T_0$ be a specific task that performs the task-to-processor assignments of all tasks. Initially, task $T_0$ is assigned to the first available processor.

We regard the set of current assignments, i.e., the status of task assignments, as a bulletin board where the set of processors are currently assigned to a particular task is specified. The set of assigned processors can be the null set, 1, 2, . . . N. The nonassigned load of each task $L(T_j)$ is recorded on the bulletin board. A processor with unused available capacity $K(P_j)$ posts its status on the bulletin board. The processor which is assigned to system management task $T_0$, matches the unused processors capacities to the nonassigned task loads. Note that the tasks and their associated loads can have priority weights.

The assignment of processors to tasks proceeds dynamically as follows: The "free" processors, i.e., those with nonassigned available processors capacities, are sequentially selected for assignment. The task with the greatest weighted load is assigned to the currently selected processor. The load of this task is then reduced by its assigned portion, for future assignments of its unrealized portion. This portion of its unassigned processing requirements, is to be assigned to upcoming "freed up" processors, i.e. candidate processors with available capacity, capable of being assigned. This process continuous ad infinitum.

An algorithm is used to find appropriate assignment of tasks to processors such that all tasks are assigned and all assignments are within processors capacities. Global assignment proceeds as follows: As previously, let $L(T_j)$ denote the processing load for task $T_j$ (instruction execution count for time t). Let $K(P_i)$ denote the capacity of processor $P_i$ (instructions executed per time t). Let $C_{ij}$ denote permissible assignments ($C_{ij}=1$ if $P_i$ to $T_j$ is allowed and 0 otherwise). $C_{ij}$ is a matrix of 1s and 0s, with processors in rows and tasks in columns. Let $Y_{ij}$ denote actual assignment of $P_i$ to $T_j$ (fraction of capacity of processor $P_i$ assigned to task $T_j$).

Figure 9:
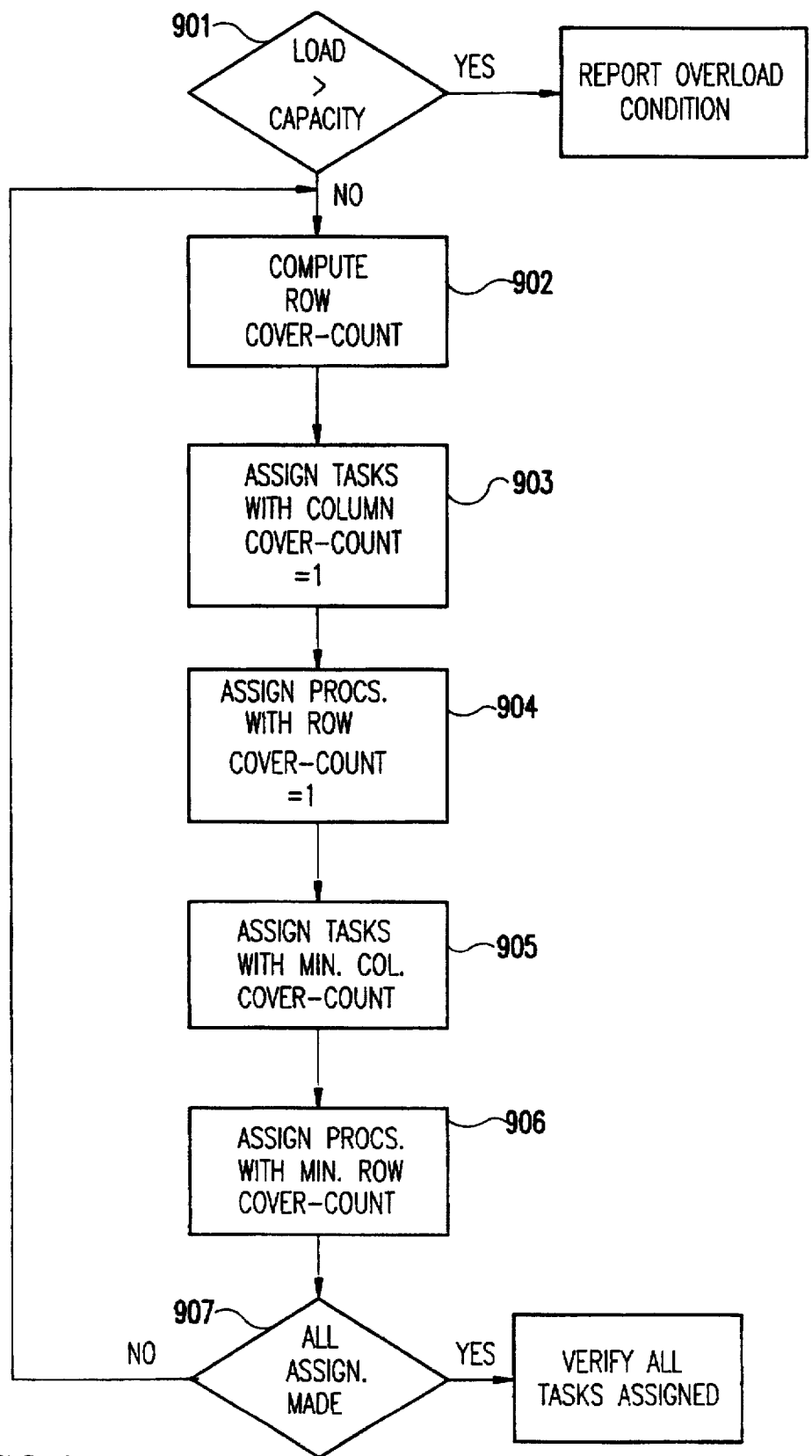
FIG. 9 is flow diagram of an implementation of workstation assignment algorithm for the implementation/ management network of FIG. 2.

The algorithm is implemented as illustrated in the flow chart of FIG. 9. In FIG. 9, the process begins with decision block 901 where it is determined that the total load does not exceed total processors' capacity. Then in function block 902, column and row cover-count of $C_{ij}$ is computed. In block function 903, all tasks with column cover-count of 1 are assigned. In function block 904, all processors with row cover-count of 1 are assigned. In function block 905, all tasks with minimum column cover-count are assigned. In function block 906, all processors with minimum row cover-count are assigned. In decision block 907, a test is made to determine if the process has been completed; if not, the steps in function blocks 902 to 906 are repeated until completion. Finally in function block 908, it is verified that all tasks were assigned. Dynamic adjustment follows processors execution and task loading changes by adjustment of $Y_{ij}$ for critical $T_j$ based on excess capacity of $P_i$.

Using the System

When faced with a new application, the system requires a systematic approach to bringing it up to full capacity. A sequence of phases which achieve that goal is described below. A complete flow-chart of the application, including all inputs, outputs and measurements and related information is prepared. Based on this, an application modeling network is constructed so that the application is defined fully, uniquely and unambiguously in the appropriate format.

The local control network and global optimization network are implemented on the application and linked to the application modeling and process definition net. All process and system parameters, required for system operation, are initialized. These include set points, tolerances, constraints, model types and timing information which are used in data acquisition and analysis. Variables are grouped into primary and secondary sets while responses are ranked in terms of their importance to the application.

Initially, the system operates as a "silent partner." This means that the process runs without any system intervention (i.e., business-as-usual) for a period of time. During that period, the system acquires data, evaluates it and builds all necessary models as well as appropriate databases.

In the second phase the system operates as a "consultant." This means that the process still runs in a business-as-usual mode, but now the system provides predictions and improvement suggestions. These are closely monitored by process personnel who compare system predictions to actual results. Any discrepancies between predicted and actual results are investigated, their causes determined and corrective action is taken.

Finally, the system gets full control of the process. This is done sequentially so that the lowest process in the hierarchy is converted to automated mode first, followed by the next hierarchical level, and so on until the complete operation is fully automated. At each of these sequential steps, satisfactory performance is verified.

The first two phases can be implemented using the system as an off-line tool. The final phase requires the system to operate on-line and real-time for monitoring, control and optimization.

Illustrative Example

Figure 10:
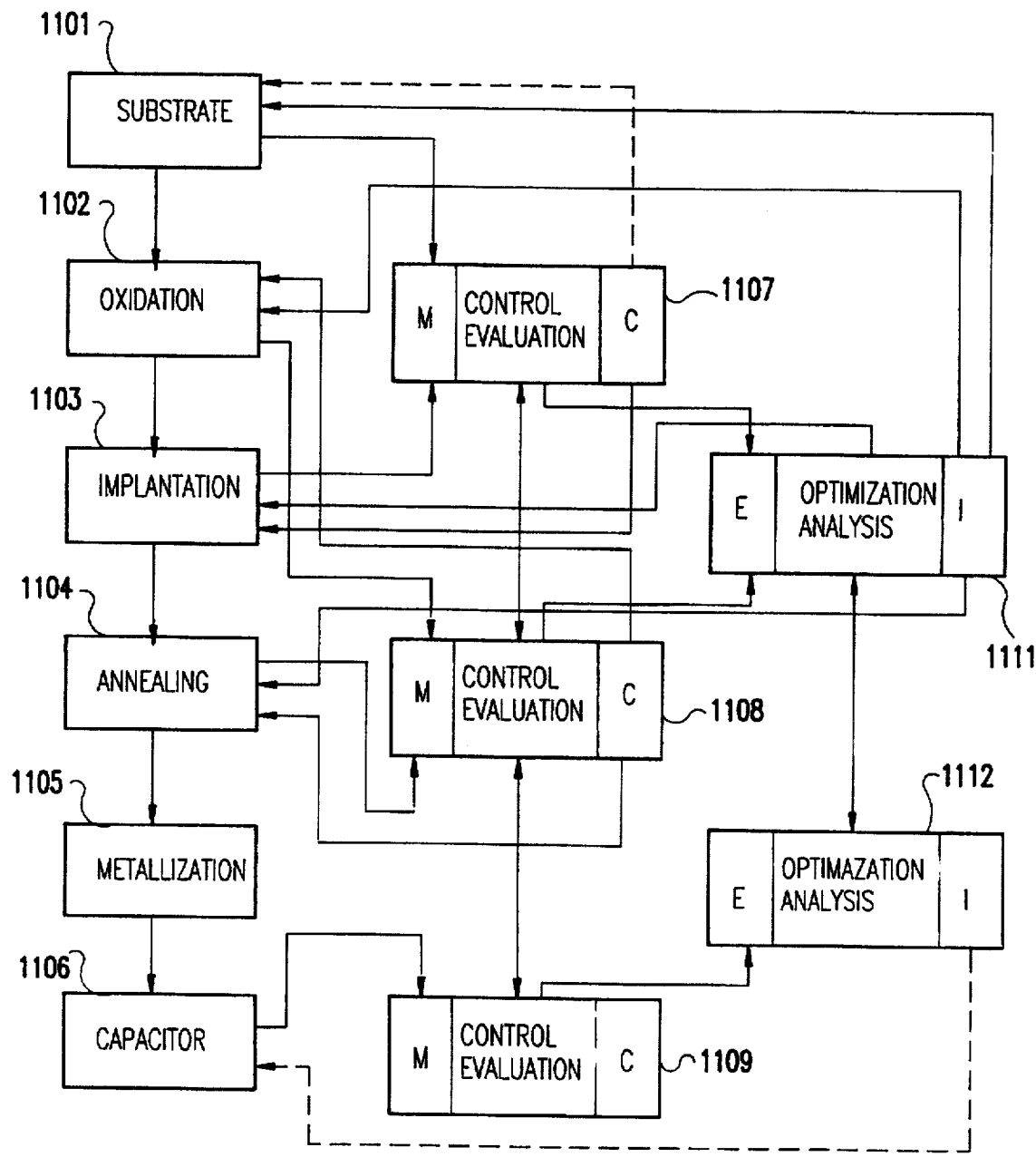
FIG. 10 is a block diagram of a specific example implementing the principles of the invention.

The structure and functional operation of the invention is illustrated by an example of semiconductor device fabrication. The specific semiconductor device is a capacitor as made in metal oxide semiconductor field effect transistor (MOSFET) technology. This is a multistep process typically involving various steps of subtractive (etch), additive (deposition) and material modification (e.g., oxidations, ion implants, etc.) processes. The device in this example is designed with a target (ideal) threshold voltage value of one volt. Referring now to FIG. 10, there is shown a specific network example implementing the invention. In this example, there are six process modeling nodes 1101 to 1106 controlled by three local control nodes 1107 to 1109 and optimized by two global optimization nodes 1111 and 1112.

The first node 1101 in the modeling network represents the substrate characterization process and includes results from all previous manufacturing operations. For this application, the substrate carries a single primary variable, charge concentration, which is considered to be uniform. The specification of this variable is a uniform Boron concentration of $(5\pm1)\times10^{16}$ atoms/cc. Secondary variables (not used in analysis) are substrate uniformity and contamination level.

The second node 1102 represents the process of substrate oxidation, performed in an oxidation furnace. The insulating oxide layer is the "gap medium" of the device, with layer thickness as the determining parameter. For this application, the primary variables are time and temperature of oxidation. The secondary variables are gas composition and partial pressure or flow rate. The primary response is oxide film thickness. The specifications for this process step are oxidation time of 45±5 minutes, oxidation temperature of 800±10° C., and oxide thickness of 24±2 nm.

The third node 1103 represents the ion implantation process. It is performed in an electron-beam system and is used to control the device's electrical properties via dopant implantation. The primary variables are ion dose and implant energy. The secondary variables are beam angle and precision parameters. A measurable response variable is the sheet resistance. The specifications for this process step are implantation energy of 30±5 keV, implantation dose of $(1\pm0.5)\times10^{11}$ atoms/cm$^2$, and sheet resistance of 5240±500 $\Omega/\square$.

The fourth node 1104 represents an annealing process in which substrates are heated in a furnace in an inert ambient. The primary variables are annealing time and temperature.

The secondary variables are inert gas composition and pressure. Responses are dopant distribution parameters. The specifications for this process step are annealing time of 60±5 minutes and annealing temperature of 1000°±10° C.

The fifth node 1105 represents the process of covering the oxidized structure with a metallic layer. The metallization is performed in an evaporation chamber. For simplicity, this process is assumed to be ideal (i.e., no need for control), completing the device. Thus, no parameters are listed or needed.

The sixth node 1106 represents the process of testing the device. Its primary response is a measurable threshold voltage with a design specification of one volt. Other measurable parameters such as transconductance and sheet resistance are not used.

The local control network controls the six process steps corresponding to the six nodes 1101 to 1106 of the modeling network. In FIG. 10, the letters "M" and "C" in the control network nodes 1107 to 1109 refer to the measurable and controllable variables in the modeling network. The local control network consists of the three interconnected nodes 1107 to 1109. The logical partition of this network reflects the tight coupling between members of each pair of process steps in terms of their effects on the fabrication process. The partition also reflects similarities in the physics of the processes. The first node 1107 controls the substrate and the implant process steps of nodes 1101 and 1102. The second node 1108 controls the oxidation and annealing process steps of nodes 1103 and 1104. The third node 1109 receives data from the product at node 1106 for evaluation.

The global optimization network optimizes device fabrication and consists of two interconnected nodes 1111 and 1112. In FIG. 10, the letter "T" in the optimization nodes refers to the ideal (target) values in the modeling network, while the letter "E" refers to evaluation information from the control network. The first node 1111 is responsive for adjusting the target (ideal) values of individual local processes. This occurs when external considerations, such as design changes, require changes in specifications or when an optimization procedure, as a result of feed forward data, requires local target changes. Node 1111 operates individually on target variables in the nodes 1101 to 1104 of the manufacturing modeling network and receives data from nodes 1107 and 1108 of the local control network. The second node 1112 of the global optimization network is responsible for computation of device optimization. Node 1112 receives updated product information from node 1109 of the local control network and derives optimization paths for the set of target parameters which are executed via node 1111.

There are seven primary variables for this process; one for the substrate, two for oxidation, two for implantation, and two for annealing. The following steps are used for data evaluation.

Ranking and Correlation of Variables

Following data acquisition, all process variables are ranked in terms of their contributions to the process and for the selection of primary and secondary variables. Ranking of the variables is performed by node 1109 of the local control network. The variables are linearly ranked, and variables and their interactions are quadratically ranked. The results of the evaluation show that device threshold voltage is affected by the following factors: oxidation temperature (50%), implantation dose (27%), oxidation time (16%), substrate dopant concentration (4%), and implantation energy (2.5%). The annealing temperature and time parameters contribute less than 0.2% to device performance.

The annealing step, node 1103, has a relatively small effect on the resulting device threshold voltage and consequently is relegated to the set of secondary variables and not used in the analysis. The interaction term between the oxidation temperature and the implantation dose is found to be as important to process description as the implantation energy. Therefore, a quadratic model describes the process fully and completely and accounts for 99.97% of device performance.

Following ranking of variables, node 1109 of the local control network computes all correlations between independent and dependent variables. The results demonstrate that highly ranked variables are also highly correlated with the response. Specifically, the partial correlation coefficient of the oxidation temperature is 0.982, followed by the implantation dose (0.966), the oxidation time (0.946), the substrate (0.826), and the implantation energy (−0.475). The partial correlation coefficients of the annealing time and temperature are −0.068 and −0.173, respectively, and are insignificant. The independent variables are independent and not correlated with one another. No hidden variables exist in this process.

With reliable data and models, each process step is evaluated and its response surface is obtained. The resulting response surfaces can subsequently be used for optimization. Because of the ranking procedure results, the response surfaces are quadratic functions of their variables.

The response surface of the second node in the manufacturing modeling network (the oxidation step) is generated by the second node of the local control network via regression analysis. This node also identifies the nominal state; that is, the time and temperature set points corresponding to the values of 45 minutes and 800° C.

Development by node 1107 of the local control network of the response surface of node 1103 of the modeling network (the implantation step) follows a similar procedure. Here, the coded coordinates of the implant energy and dose at the current process mean are an energy of 30.1 keV and a dose of $1.1 \times 10^{12}$ atoms/cm$^2$.

The response surface of node 1104 of the modeling network (the annealing step) is ignored due to its small impact on device performance.

The response surface of node 1106 of the modeling network describes the performance of the resulting device as a function of all independent variables in device fabrication. The multiple correlation coefficient is 0.9997, and the standard error is 0.005. The data fit is at a 95% confidence level. This excellent fit indicates that the relevant device fabrication parameters are included in the model. At the nominal set points for all seven independent variables, the device response has a threshold voltage of 1.03 V, which differs from the target of 1.00 V by only 0.03 V.

A product response surface is also generated in terms of the measurable dependent or output variables of individual process steps. For a nominal substrate concentration of $1.0 \times 10^{16}$ atoms/cc, the device threshold voltage is derived as a function of oxide thickness and the implant sheet resistance. The nominal state corresponds to an oxide thickness of 24.0 nm and an implant sheet resistance of 5240 Ω/□. The process mean state corresponds to an oxide thickness of 24.3 nm and a sheet resistance of 5263 Ω/□.

The product response map, originally generated in terms of all seven independent variables, need only be described in terms of three measurable dependent variables; substrate doping level, oxide thickness, and implant sheet resistance.

Following evaluation, the local control network computes a control path from process current state to its nominal state. The nominal state is defined by the current settings or set points of the ideal variables. The second node of the local control network computes the positions of the actual and nominal oxide thickness for the oxidation step and determines the adjustments required to control the oxidation time and temperature. This node then instructs the second node of the manufacturing modeling network to reduce the time by 0.085 minutes and the temperature by 0.1° C. For the implantation step, the first node of the local control network follows a similar procedure which results in an implant energy reduction of 0.1 keV and an implant dose of $0.1 \times 10^{12}$ atoms/cm$^2$.

Optimization consists of making adjustments to the target variables, employing feedback to improve future product, and feed forward to bring off-target product back on target. The setting so all target parameters in the modeling network are performed by the second node via the first node of the optimization network. The optimized state of the device occurs at updated values of 25.2 nm for the oxide thickness and 5590 Ω/□ for the sheet resistance. The first node then updates the corresponding ideal values in nodes 1102 and 1103 of the modeling network.

In the response surface map of the device, the current set points for all process steps result in a threshold voltage of 1.03 V. To achieve the required value of 1 V, node 1112 of the optimization network computes the proper adjustments to the set points. These are substrate concentration of $4.9 \times 10^{16}$ atoms/cc, oxidation time of 44.9 minutes, oxidation temperature of 800.1° C., implant energy of 29.95 keV, implant dose of $9.15 \times 10^{12}$, and annealing time and temperature of 59.97 minutes and 999.8° C., respectively. Update of the set points is performed by node 1112, via node 1111 which controls the ideal variables in nodes 1101 to 1104 of the modeling network.

The invention makes feed forward adjustments for a device in which several process steps are off their targets. To achieve a threshold voltage of 1 V with an initial substrate concentration of $4.8 \times 10^{16}$ atoms/cc which is lower than the target of $5.0 \times 10^{16}$ but within the $\pm 0.5 \times 10^{16}$ tolerance. Node 1112 of the optimization network derives an oxidation time of 44.837 minutes which is within specifications of 45±2.5 minutes. These modified values for the oxidation step bring the capacitor back on the target of 1 V without changes in the following process steps. Node 1111 of the optimization network updates the ideal values in node 1102 of the modeling network.

Given that the oxidation step results in oxidation time of 46 minutes and oxidation temperature of 807° C., which is off the temperature specification of 800°±5° C., the second node of the optimization network adjusts the implantation energy to 52.853 keV to bring the capacitor properties back on target assuming that the remaining variables are on target. Node 1111 of the optimization network updates the ideal values of node 1103 of the modeling network.

Given that the implantation step results in an implant energy of 30 keV and an implant dose of $5.6 \times 10^{11}$ atoms/cm$^2$ on the energy target but off the dose specification of $(1 \pm 0.25) \times 10^{11}$, node 1112 of the optimization network calculates that an annealing time of 59.772 minutes is required to bring the capacitor back on target with a nominal annealing temperature of 1000° C. Node 1111 of the optimization network updates the ideal values of node 1104 of the modeling network.

Note that the invention eliminates unnecessary scrapping or rework of intermediate product which would otherwise have occurred because of the off-specification oxidation temperature and implant dose. This feature is unique and clearly highly desirable.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A comprehensive, generic mechanism for modeling, monitoring, controlling and optimizing a manufacturing process as an on-line, real-time system, said mechanism comprising:

an application modeling network modeling equipment and processes for a specific manufacturing application, said application modeling network comprising nodes defining a plurality of processes, including specifications and tolerances, in the manufacturing application and edges interconnecting said nodes representing product flow;

a local control network connected to said application modeling network and evaluating information from said application modeling network, said local control network comprising nodes connected to selected nodes of said application modeling network and edges specifying control parameters flow, said local control network tuning processes of the nodes of the application modeling network as close as possible to current target parameters; and a global optimization network connected to said local control network and to said application modeling network for processing information from said local control and application modeling networks and adjusting target parameters in the application modeling network to improve overall performance of said manufacturing process, said global optimization network comprising nodes performing statistical analysis of said information and edges specifying data analysis flow, wherein only the application modeling network is application dependent, the local control and global optimization networks being application independent, whereby all manufacturing processes are treated identically, thereby simplifying computational complexity with only a minimal set of parameters being obtained at any manufacturing level.

2. The system recited in claim 1 further comprising an implementation/management network connected to said global optimization network and said application modeling network, said implementation/management network comprising a plurality of interconnected workstations in a loosely-coupled net.

3. The system recited in claim 2 including a dynamic task management system which evaluates load requirements, processor capacities, and processor status, and assigns processing tasks to workstations.

4. The system recited in claim 3 wherein the dynamic task management system includes a control task in addition to standard processing tasks, said control task being assigned to one of said workstations serving as a master controlling other workstations as slaves and managing task assignments based on current loads of said other workstations.

5. The system recited in claim 4 wherein in the event of a malfunction of a workstation assigned said control task, another workstation in the net is automatically assigned the control task.

6. The system recited in claim 1 wherein the application modeling network treats the manufacturing process as a hierarchy of manufacturing processes in which each manufacturing process model consists of all inputs, outputs, constraints, specifications, and interconnections which fully describe the manufacturing process including its correlation with to other manufacturing processes, the outputs of lower level processes in the hierarchy being input process variables at a next level in the hierarchy.

7. A comprehensive, generic mechanism for modeling, monitoring, controlling and optimizing a manufacturing process as an on-line, real-time system, said mechanism comprising:

an application modeling network modeling equipment and processes for a specific manufacturing application, said application modeling network comprising nodes defining a plurality of processes, including specifications and tolerances, in the manufacturing application and edges interconnecting said nodes representing product flow;

a local control network connected to said application modeling network and evaluating information from said application modeling network, said local control network comprising nodes connected to selected nodes of said application modeling network and edges specifying control parameters flow, said local control network tuning processes of the nodes of the application modeling network as close as possible to current target parameters;

a global optimization network connected to said local control network and to said application modeling network for processing information from said local control and application modeling networks and adjusting target parameters in the application modeling network to improve overall performance of said manufacturing process, said global optimization network comprising nodes performing statistical analysis of said information and edges specifying data analysis flow, wherein only the application modeling network is application dependent, the local control and global optimization networks being application independent, whereby all manufacturing processes are treated identically, thereby simplifying computational complexity with only a minimal set of parameters being obtained at any manufacturing level;

an implementation/management network connected to said global optimization network and said application modeling network, said implementation/management network comprising a plurality of interconnected workstations in a loosely-coupled net, wherein said workstations operate in three modes, a first mode wherein the manufacturing process runs without any system intervention during which period the system acquires data, evaluates the data and builds models and databases for the manufacturing process, a second mode wherein the manufacturing process continues to run without system intervention and the system provides predictions and improvement suggestions, and a third mode wherein the system receives full control of the manufacturing process, said system operating in the first and second modes as on off-line tool and in the third mode as an on-line tool for real-time monitoring, control and optimization.

8. The system recited in claim 7 wherein in the third mode, control of the manufacturing process is granted sequentially from the lowest manufacturing process in the hierarchy to the next hierarchical level until the complete operation is automated, satisfactory performance being verified at each sequential step in the granting of control.

* * * * *